(12) United States Patent
Walker

(10) Patent No.: US 7,734,606 B2
(45) Date of Patent: Jun. 8, 2010

(54) SYSTEM AND METHOD FOR REGULATORY INTELLIGENCE

(75) Inventor: Melissa C. Walker, Wildwood, MO (US)

(73) Assignee: Graematter, Inc., Las Vegas, NV (US)

( * ) Notice: Subject to any disclaimer, the term of this patent is extended or adjusted under 35 U.S.C. 154(b) by 1223 days.

(21) Appl. No.: 11/229,071

(22) Filed: Sep. 15, 2005

(65) Prior Publication Data

US 2006/0059137 A1   Mar. 16, 2006

Related U.S. Application Data

(60) Provisional application No. 60/609,960, filed on Sep. 15, 2004.

(51) Int. Cl.
G06F 7/00 (2006.01)
G06F 17/30 (2006.01)

(52) U.S. Cl. ............... 707/705; 707/805; 707/999.107; 707/999.102

(58) Field of Classification Search ............ 707/1, 707/3, 10, 100, 104.1, 705, 805, 999.107, 707/999.102; 715/235, 234, 239; 705/7, 705/8, 9
See application file for complete search history.

(56) References Cited

U.S. PATENT DOCUMENTS

| | | | |
|---|---|---|---|
| 5,625,816 A | 4/1997 | Burdick et al. | |
| 6,424,980 B1 | 7/2002 | Iizuka et al. | |
| 6,442,548 B1 | 8/2002 | Balabine et al. | |
| 6,499,036 B1 | 12/2002 | Gurevich | |
| 6,539,378 B2 * | 3/2003 | Gupta et al. | 707/5 |
| 6,694,307 B2 * | 2/2004 | Julien | 707/3 |
| 6,721,726 B1 | 4/2004 | Swaminathan et al. | |
| 2001/0037332 A1 | 11/2001 | Miller et al. | |
| 2001/0049677 A1 | 12/2001 | Talib et al. | |
| 2002/0049756 A1 | 4/2002 | Chua et al. | |
| 2002/0099685 A1 | 7/2002 | Takano et al. | |
| 2002/0133504 A1 | 9/2002 | Vlahos et al. | |
| 2002/0147704 A1 | 10/2002 | Borchers | |
| 2003/0065690 A1 * | 4/2003 | Kelley | 708/100 |
| 2003/0115080 A1 * | 6/2003 | Kasravi et al. | 705/1 |
| 2003/0208465 A1 | 11/2003 | Yurko et al. | |
| 2003/0212673 A1 | 11/2003 | Kadayam et al. | |
| 2004/0059728 A1 | 3/2004 | Miller et al. | |
| 2004/0068514 A1 | 4/2004 | Chundi et al. | |
| 2004/0073498 A1 * | 4/2004 | Breen et al. | 705/27 |
| 2004/0177326 A1 * | 9/2004 | Bibko et al. | 715/530 |
| 2004/0193634 A1 * | 9/2004 | Goodlett et al. | 707/102 |
| 2005/0102173 A1 * | 5/2005 | Barker et al. | 705/8 |
| 2006/0059137 A1 * | 3/2006 | Walker | 707/3 |

\* cited by examiner

Primary Examiner—Miranda Le
(74) Attorney, Agent, or Firm—Lewis and Roca LLP

(57) ABSTRACT

A system and method are disclosed for locating, collecting, collating, analyzing, and reporting on summarized data that is generated from regulatory compliance matter data. Data is collected and compiled from multiple sources, including government databases, web pages, and regulatory documents; These collected data are consolidated and reconciled. A single topic record is created for a person, company, or product. Duplication and redundancy within the information are reduced. Corrections in data format are made for inconsistencies that exist between different information sources. Broad and/or narrow searches are enabled with the retrieval of information and/or relevant documents. The integrated data and associated analyses can be presented in reports that can be made accessible through a LAN, a WAN, a desktop, and/or a web interface.

15 Claims, 11 Drawing Sheets

FIG. 6

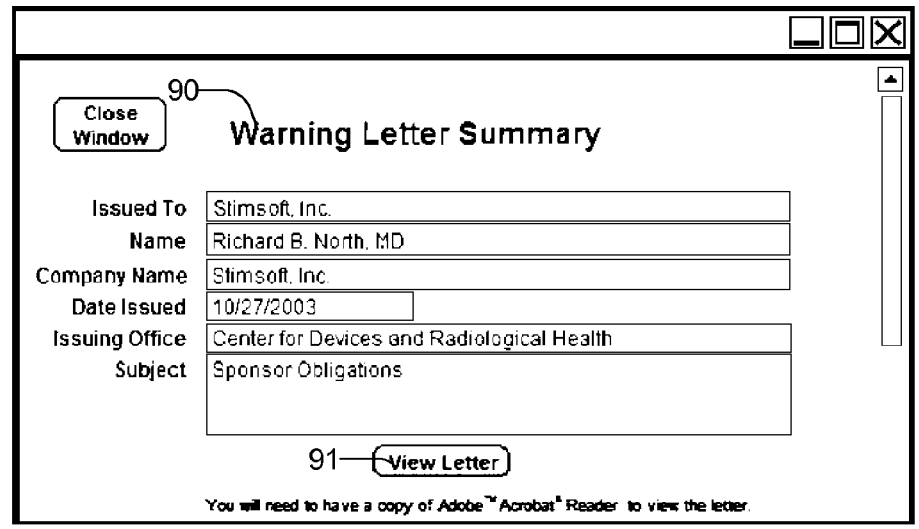
FIG. 7
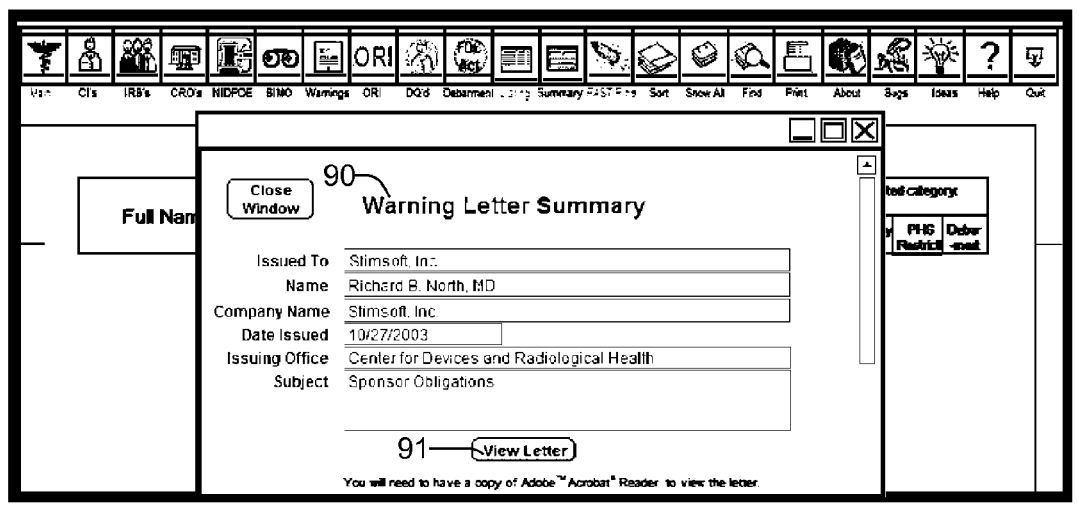

Subject: Oxycuritol  
Sponsor: ABC Drugs, Inc.  
1234 South Pine Lane  
Anytown, GA 99382

Date: 8/10/2004

100

Manufactured By:
- ABC Drugs, inc.
- 14459 Industrial Parkway
- Anytown, GA 99384

101

Orphan Drug Status:
- No

102

Type of Review:
- Routine

Approval Information
- NDA #93-12345
- Filed June 4, 1993
- Approved November 30, 1995
- Seven supplements filed as of August 10, 2004

103

104

Summary of Safety & Effectiveness
- Available

Dosage Form:
- 25, 50, 75, and 100mg tablets

Labeler Code:
- 83846HE79

Package Type:
- 3, 6, 12 and 16 pack blister
- Bulk

Drug Master File
- Filed March 23, 1885 by ABC Drugs, Inc.
- Active Status

105

Safety Related Label Changes
- None

Recalls
- Class II recall, initiated January 2, 1997 for incorrect lot numbering on label. 50,000 units distributed in the US. Lot numbers34-98573, 34-8i443, and 37-88382. Recall complete July 8, 1997.

106

Adverse Event Reports
- 2,331 non-serious events
- 82 serious events
- 17 deaths

107

Warning Letters:
- Advertising and promotion practices, January 12, 2001

FIG. 8

110 — Subject: Implantable Staple    Date: 8/10/2004
Product Code:      XXX
Class:             II
21CFR Reference:   878.4750
Classification Name: Implantable Staple
Identification:    An implantable staple is a staple-like device intended to connect internal tissues to aid healing. It is not absorbable.

111 — Cleared Premarket Notifications:
- 437 cleared for 39 manufacturers
- 391 Traditional
- 23 Abbreviated
- 23 Special 112 — Average Review Times
- All         113 days
- Traditional 173 days
- Abbreviated 72 days
- Special     32 days 113 — Recalls
- MedCloz, Inc. Class II recall, initiated July 2, 2001 for incorrect staple size indicator. 300 units distributed in the US. All lot numbers. Recall complete October 10, 2001.
- Adverse Event Reports
- 6741 malfunctions
- 43 serious injuries
- 9 deaths Warning Letters:
- Skin Close, Inc., Advertising and promotion practices, April 12, 2004
- Zipup, Corp, GMP and CAPA violations, July 17, 2004

FIG. 9

SYSTEM AND METHOD FOR REGULATORY INTELLIGENCE

CROSS REFERENCES TO RELATED APPLICATIONS

This application claims priority to U.S. Provisional Application Ser. No. 60/609,960, filed on Sep. 15, 2004, titled "System and Method For Regulatory Intelligence", which is incorporated herein by reference.

FIELD

The present invention relates generally to data consolidation, and is more particularly related to the consolidation of and reporting on regulatory data, where the reporting can be used for regulatory intelligence.

BACKGROUND

With the introduction and rapid adoption of the Internet and the World Wide Web, huge amounts of data and information are increasingly more accessible. A variety of companies have developed "products" consisting of specific information topics.

Commercial entities are not alone in taking advantage of this technology. Regulatory authorities in federal, state, and local governments are providing citizens access to frequently requested information via the Internet. The Freedom of Information Act (FOIA) has allowed access to a wide variety of documents and regulatory records, making these available upon request. More and more, these documents and regulatory records are made available through government websites.

Although the ready availability of regulatory information has significantly improved over the past decade, the ability to use the information in a meaningful way remains limited. Compliance and enforcement data that are collected and used by regulatory agencies are highly compartmentalized according to the agency responsible for collecting it. There is little consolidation of inter-agency regulatory information, making it difficult to quickly and easily perform regulatory performance assessments for either the regulatory agencies or the regulated party. Even regulators are forced to access multiple information sources to completely characterize regulatory performance and compliance history.

Consolidation of the many data repositories of regulatory agencies is problematic for several reasons. As each agency has developed their database systems to meet their own needs, the data format, user interface, and data definitions are not necessarily consistent with other agency information systems. Correcting this condition to allow inter-agency access under a single compatible system would be expensive, time-consuming, and resource intensive. Government agencies have little available resources to accomplish such a consolidation.

For regulated industries, the problem is similar. Enforcement focus is subject to change, depending upon the environment. For instance, regulatory agencies may choose to focus closely on enforcement of certain environmental laws following a much publicized chemical accident. Enforcement focus may also change for less obvious reasons. A problem encountered by one manufacturer may alert the regulators to scrutinize areas that have not previously been examined. Without rapid access to good regulatory intelligence, both companies and regulators may be unprepared to manage a public health issue.

It is difficult to stay current with the constantly changing requirements and compliance trends. Today, there is not a timely, efficient, and effective way to stay current. Regulatory research into specific areas is difficult and time-consuming. This research requires highly specialized knowledge of the regulatory processes and the available information sources.

The diverse nature of the information sources discussed above makes integration of the data resource intensive and costly. Accordingly, there would be an advantage in the art to provide a system and method for addressing these issues by providing an easy to use, single point reference that enables research of or relating to people, products, companies, regulators and/or the regulatory environment. Moreover, such a system and method would provide ready access to understandable regulatory intelligence to facilitate the regulatory process, and to benefit related government agencies, industry, and consumers.

SUMMARY

A system and method are provided for locating, collecting, collating, analyzing, and reporting data generated about regulatory compliance matters, turning disorganized data into regulatory intelligence. The system and method can collect and compile data from multiple sources, including government databases, web pages, regulatory documents, and data from other sources. A consolidation and reconciliation is made of the collected data. A creation is also made of an indexed topic record for a person, company, and/or product, thereby reducing duplication and redundancy within the information. This allows seemingly unrelated records to be laterally related for broadening of on-demand query parameters. Corrections are also made to data format in consistencies that exist between different information sources. Broad and/or narrow searches with information and relevant document retrieval are enabled. The integrated data and associated analyses can be presented in reports that can be accessible through a LAN, a WAN, a desktop, and/or a web interface.

These and other features of the present invention will become more fully apparent from the following description and appended claim, or may be learned by the practice of the invention as set forth hereinafter.

BRIEF DESCRIPTION OF THE DRAWINGS

In order that the manner in which the above-recited and other advantages and features of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which:

FIG. 6 shows a sample of the records returned following a query, where each indicator shown as "Yes" informs a user where matching information exists;

FIG. 7 shows respective examples of detail in a single information type for a regulatory warning letter;

FIG. 8 shows a sample report for a drug reflecting consolidated data from multiple sources;

FIG. 9 shows a sample Regulatory Performance report for a medical device;

DETAILED DESCRIPTION

Figure 1:
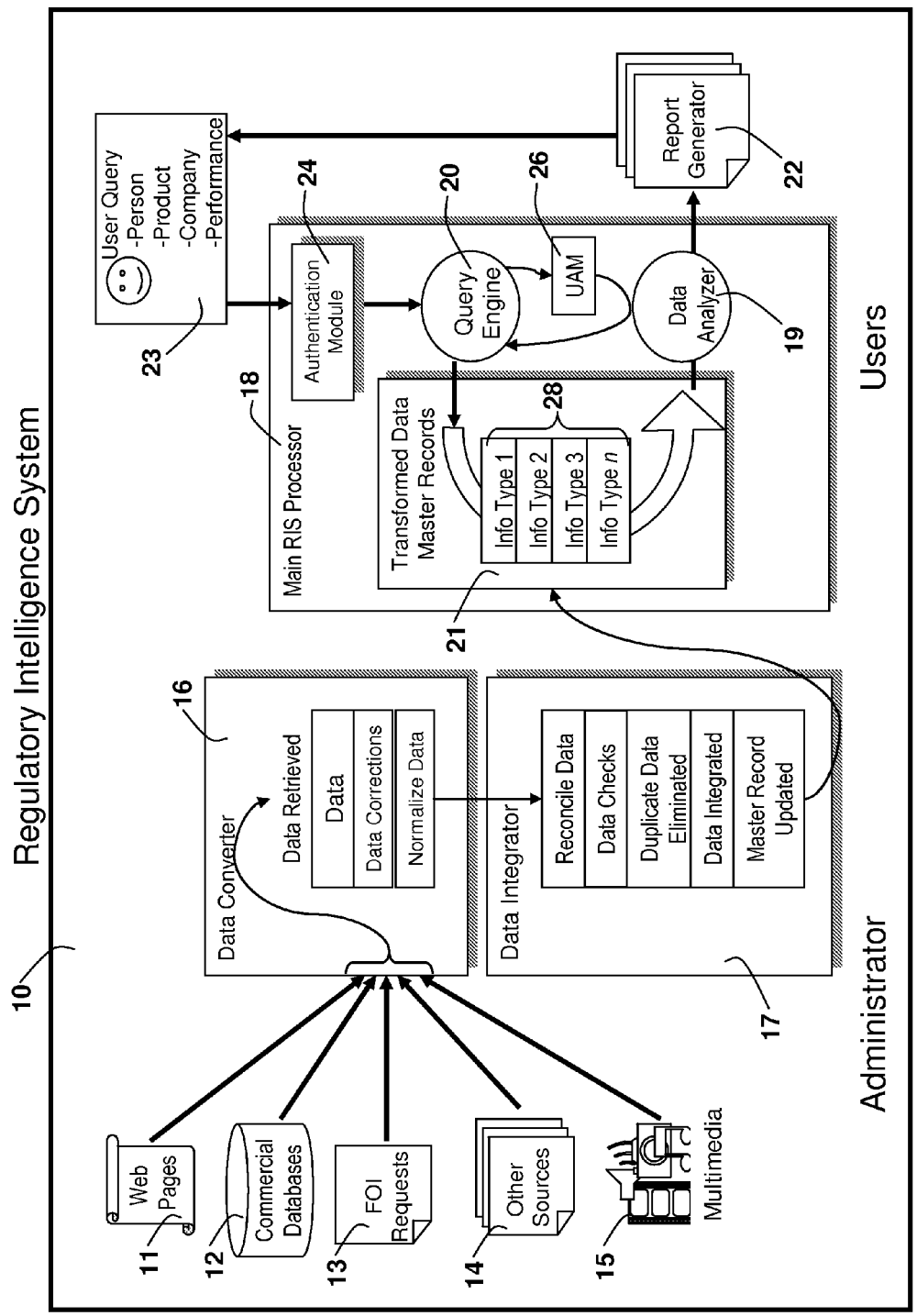
FIG. 1 shows an exemplary implementation of a Regulatory Intelligence System (RIS)

Implementations provide a system and method for locating, collecting, collating, analyzing, and reporting on summarized data that is generated from regulatory compliance matter data. The regulatory compliance matter data is collected and compiled from multiple sources, including government databases, web pages, and regulatory documents. The collected and compiled regulatory compliance matter data is consolidated and reconciled. A single topic record is created for a person, company, or product. Duplication and redundancy within the regulatory compliance matter data are reduced. Corrections in data format are made for inconsistencies that exist between different information sources. Searches of varying scope are enabled with the retrieval of information. The consolidated and reconciled regulatory compliance matter data, and associated analyses, can be presented in user-selected reports.

A regulatory information management system (RMS), in various implementations, is provided. The RMS provides for the management of regulatory information that is obtained from a plurality of heterogeneous information sources. The RMS includes means for a querying a plurality of sources to collecting information. The querying means can include a query engine that enables searches of the plurality of sources to derive specific information specified to the query engine. These sources include, but are not limited to, a plurality of databases residing on respective geographically dispersed servers. Each database is a repository for regulatory information, including information from public, governmental, and private sources. Each server, and the means for collecting information, is in communication by one or more networks.

The RMS includes means for integrating the collected information into a predetermined form. The integrating means may also include means for reconciling the collected information prior to the integration thereof it into the predetermined form. The reconciling means can also locate duplicate data and eliminate redundancies, as well as consolidate data retrieved from the plurality of heterogeneous information sources so as to be conformed into one or more predetermine record layouts or formats, where each record has one or more predetermined fields.

Optionally, the RMS may include means for summarizing the collected information in the predetermined form, and means for analyzing the collected information in the predetermined form. Further, the RMS may include a means for reporting, The reporting means may report the collected information into the predetermined form, the summarized collected information in the predetermined form, the analyzed collected information in the predetermined form, and/or the summarizes and analyzed collected information in the predetermined form.

In general, the reporting means reports the results of information derived from information specified to the query engine. The results are the result of integrating the collected information into a predetermined form. The collected information in the predetermined form may also be reconciled prior to being integrated into the predetermined form. Also, an analysis and summary of the collected information by be performed prior to the reporting thereof by the reporting means. Alternatively, the analysis and summary of the collected information by be performed prior to the integration of the collected data into the predetermined format.

In that access to, and retrieval of data from, the plurality of heterogeneous information sources may require access privileges and authorization for same, the RMS may also include means for performing authorization for access and for retrieval of data from the plurality of heterogeneous information sources. The authorization and retrieval means may perform one or more steps for each of the heterogeneous information sources. Each heterogeneous information source can be a local data source, a web-based data source, a commercial database, a hard copy document database, or a database having data in another electronic format.

The RMS integrates the collected information into the predetermined form, where the predetermined form has a consistent electronic form, such as a consistent tabular or other matrix format. Further, the RMS can operate upon the collected information, given a predetermined error determination and correction routine, in order to correct the collected information. The predetermined error determination and correction routine will preferably use a standard that is recognized by an industry association that corresponds to the regulatory data being collected.

In order to place the collected information into the predetermined form, the collected information can be normalized into a predetermined format which includes a predetermined presentation format. The data in the predetermined form can be in one or more predetermined fields. As such, the data in the predetermined form and predetermined fields can be integrated so as to link, or otherwise be associated with, a subject, a category, or another predetermined field. Each heterogeneous information source can be, for instance, a database that is comprised of relational tables that associate the data and the data fields therein with the data and the data fields of another database that is also comprised of relational tables.

The reporting means can display data associated, according to a predetermined standard, with a single subject. The display can include the presentation of data retrieved from the plurality of heterogeneous information sources. Moreover, the display of the retrieved data can presented via a web-based interface, a locally accessed server or desktop interface, or a telecommunications access.

In other implementations, a computer readable medium that includes instructions. The instructions, when executed by a computer in communication with one or more databases of regulatory information, locates and retrieves the regulatory information in the one or more databases, consolidates the retrieved regulatory information, analyzes the consolidated regulatory information, and outputs a report of the analysis of the consolidated regulatory information. The executed instructions can also perform one more management functions upon the regulatory information of the one or more databases of regulatory information.

FIG. 1 depicts an exemplary process illustrating an embodiment of a Regulatory Intelligence System (RIS) 10. The RIS 10 includes a Data Converter (DC) 16, a Data Integrator (DI) 17, a Transformed Data Master Record (TDMR) 21, an Authentication Module (AM) 24, a Data Analyzer (DA) 19, a User Automation Module (UAM) 26, a Query Engine (QE) 20, a Report Generator (RG) 22, and a Main Processor (MP) 18.

The RIS 10 is controlled through an intuitive user interface (UI) by which the user composes and submits queries 23; reviews the information found; selects report preferences; and outputs (e.g.; prints) reports. Users are identified and their access is authenticated through the AM 24 upon requesting access to the RIS 10 via assigned user passwords and identifiers. The identifiers define the user's level of access and the types of information they have permission to access. For example, a user may only be interested in accessing regulatory information relating to medical devices. As such, other regulatory information categories (i.e., pharmaceutical or environmental hazards) would not be accessible.

Figure 6:
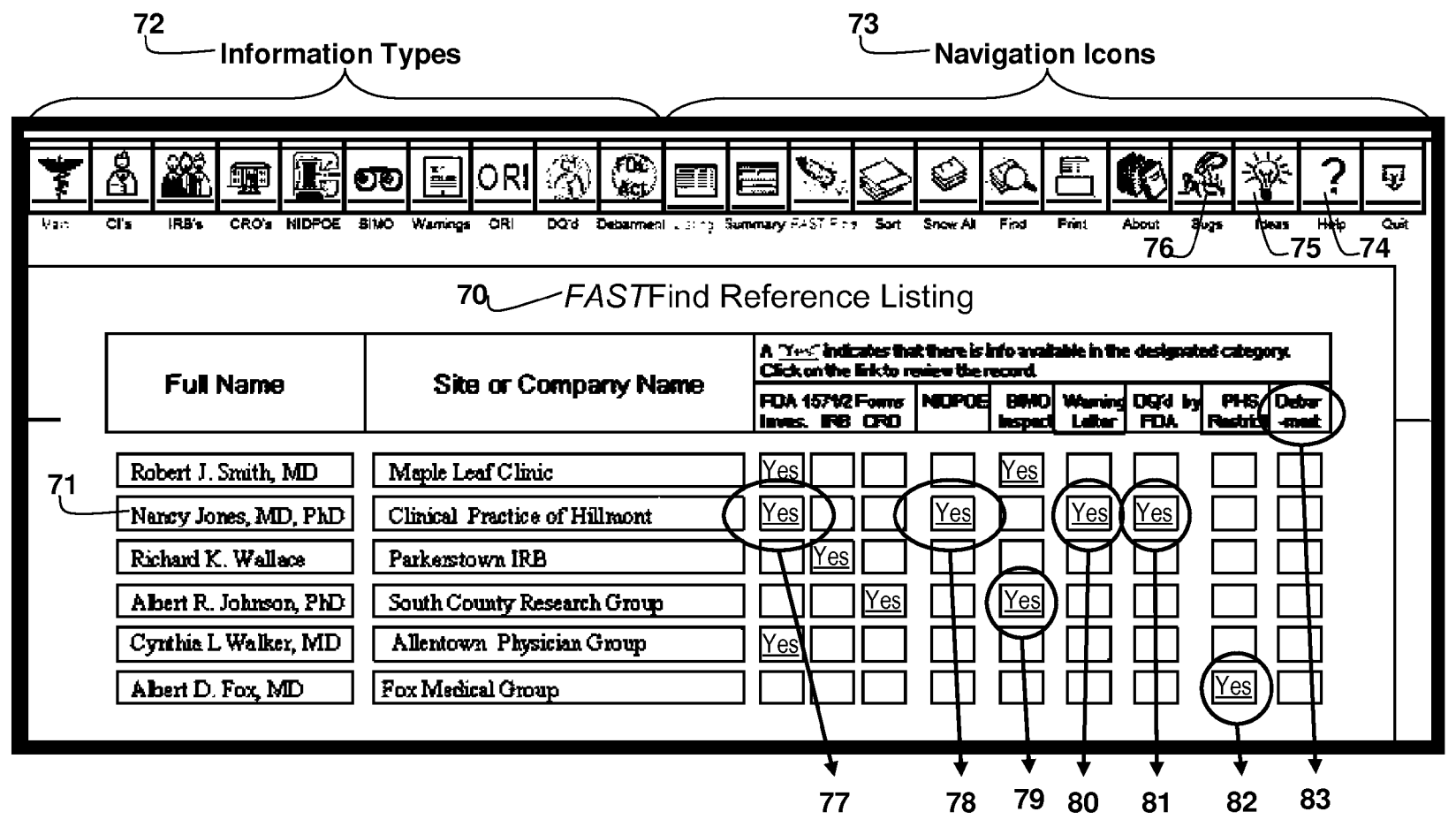

Throughout the UI, as shown in FIG. 6, access to the Help function 74 is available to assist the user in understanding the information found and the navigational icons 73 assist the user in navigating within the RIS 10. The RIS 10 includes a glossary of terms that explains the significance of each information type, as well as any commonly used acronyms. Also included are features that allow the users to request documents that are not included in the RIS 10; submit suggestions for enhancing or adding features 75; and report bugs 76 encountered while using the RIS 10.

The RIS 10 includes a plurality of heterogeneous information sources, each of which may have different information types (e.g.; different files, different records with each file, different fields within each record, etc.). Some information types are extracted from public websites 11, where this information may reside within the text of a web page or in a downloadable file. For example, the Office of Inspector General (OIG) publishes a list of persons or entities that have been excluded from participation as a provider in the Medicare/Medicaid program. Also by way of example, adverse event reports for medical devices are typically contained in a downloadable file that can be imported into a database.

Some databases are not available on a website, but are available for purchase through specific government or private resources, such as commercial databases 12. For example, establishments and individuals who request and obtain a permit to manufacture or prescribe controlled substances are listed in a purchasable dataset from the US government.

Both documents and data may be obtained through a Freedom of Information Act (FOIA) request 13. FOIA made available certain types of information that is considered to be "public" information. A written request sent to the appropriate FOIA office enables documents and data that are not published on public Web pages to be accessed and incorporated into the RIS 10. The user can generate this request directly through the RIS 10.

A variety of other documents or information sources 14 can also be included in the RIS 10. For example, news releases or curriculum vitae may also be included in the RIS 10. These items are retrieved from a variety of public sources.

Multimedia items 15 may also be incorporated into the RIS 10. For example, photographs of products or people may be located from public sources and incorporated.

Using one or more components of RIS 10, each information source 11-15 can be checked at one or more predetermined intervals to determine if new or changed information is available. The frequency of the checks is determined by the nature of the data and the information source. Some sources are updated daily, while others may be updated annually.

Figure 2:
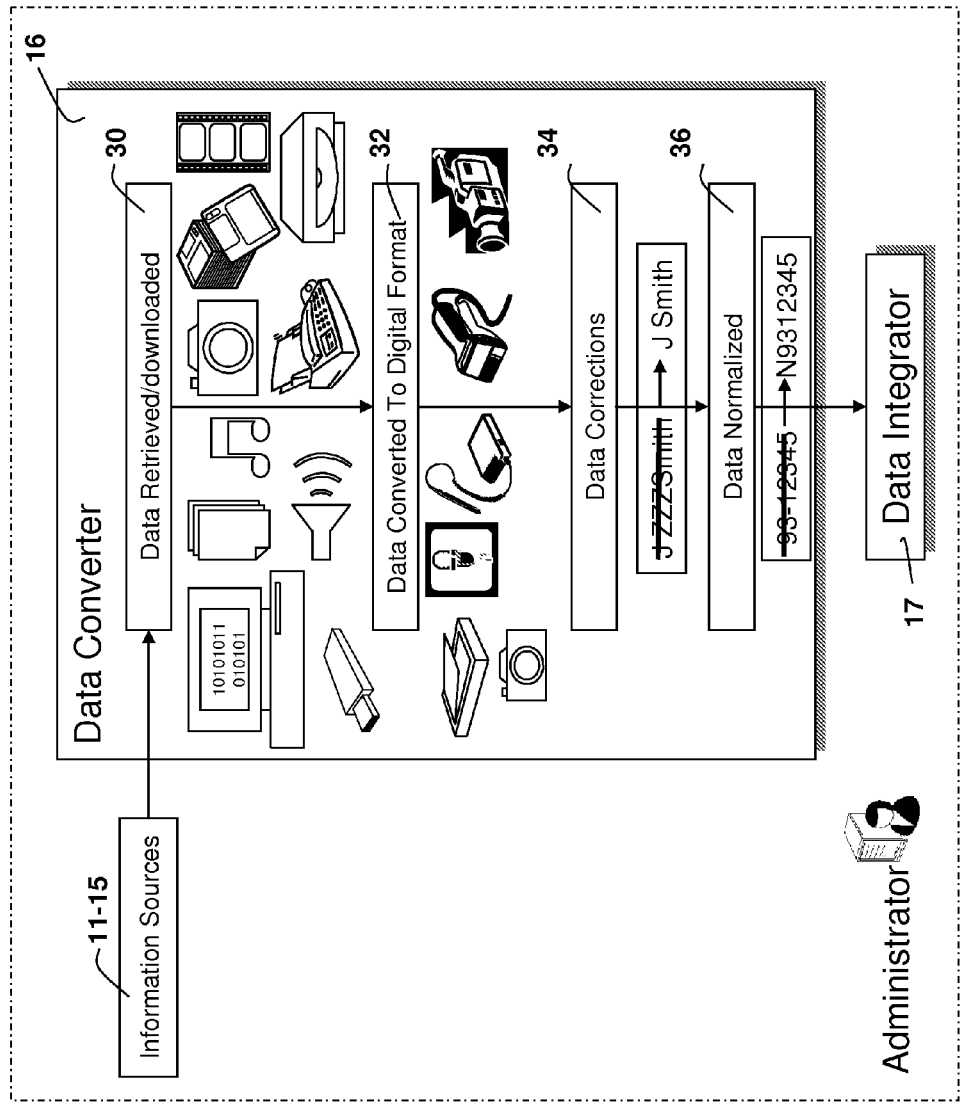
FIG. 2 shows steps in a process within a Data Converter (DC) within the RIS of FIG. 1.

Each information source may contain one or more information types. Each information type may have one or more sources. The sources may be in different forms or locations sponsored by different agencies or groups. As seen in FIG. 2, Data retrieved 30 by the DC 16 may be in one of many different formats, ranging from a direct database download to a hard copy of a document.

As the information is retrieved 30, the source and date that the data was obtained is recorded, although the user may not have access to this information. This allows traceability of the data for source verification and information history.

Each information type 28 has its own characteristics and style. Thus, the data from each source has a defined set of rules and a regimen for conversion 32 within the DC 16. Each information type 28 can be converted into a consistent digital format suitable for importing into an electronic database. For example, data retrieved may be in a portable data format (.PDF) or in a tab-separated text format. A table published on a web page is extracted, broken down into specified data fields, and converted into a spreadsheet or into tab-separated text. Appropriate conversion 32 is completed prior to the data correction 34 process.

Data corrections are made 34 for data inconsistencies to allow consolidation and integration of data from multiple sources. Errors can exist in data sets obtained from an information source. For example, the data listing for clinical investigators of drug clinical trials can include multiple listings that begin with a sequence of "ZZZ". If this data was not corrected, searches for "Jack Smith" would not recognize a record for "Jack ZZZSmith". A means for identifying such errors and correcting them, such as one or more predetermined filters, can be provided by software and/or hardware. As new discrepancies are discovered, the system and method can add, alter, or delete one or more predetermined filters so as to identify and correct discrepancies as they are identified.

Over time, the information sources may change the way that the information is collected and/or reported. For example, information sources are increasingly converting their frequently used information (for example, adverse event reports or establishment registrations) into a searchable format via a web interface. The DC 16 includes internal checks that detect changes that occur in order to appropriately adjust the conversion (DC 16), integration (DI 17) and subsequent reporting (RG 22).

Inconsistency in terminology is likely across heterogeneous information sources (e.g.; disparate data sources), which may be due to each data source having been created with a specific use in mind that differed from that of other data sources. These data must then be normalized 36 before data integration 17. One source of New Drug Application numbers, for example, may include a two digit year followed by a dash in front of a five digit number (i.e.; 93-12345). Another source may omit the dash and add an "N" at the beginning of the number (i.e.; N96312345). Data fields such as these are considered "key fields" and must be in a consistent form for accurate integration and cross-referencing.

As regulatory requirements change, an entire scheme of information may change. The DC 16 detects and allows compensation for these changes. For example, prior to 1996, adverse events relating to medical devices were reported under a specified set of requirements. Reports made to the Food and Drug Administrations required specific information to be included in the report. A new system was introduced in 1996 that increased the amount of information collected and altered the regulatory requirements for reporting. When changing from the old system to the new system, a set of new rules and a conversion regimen 32 are desirable to maintain continuity within the RIS 10.

Figure 3:
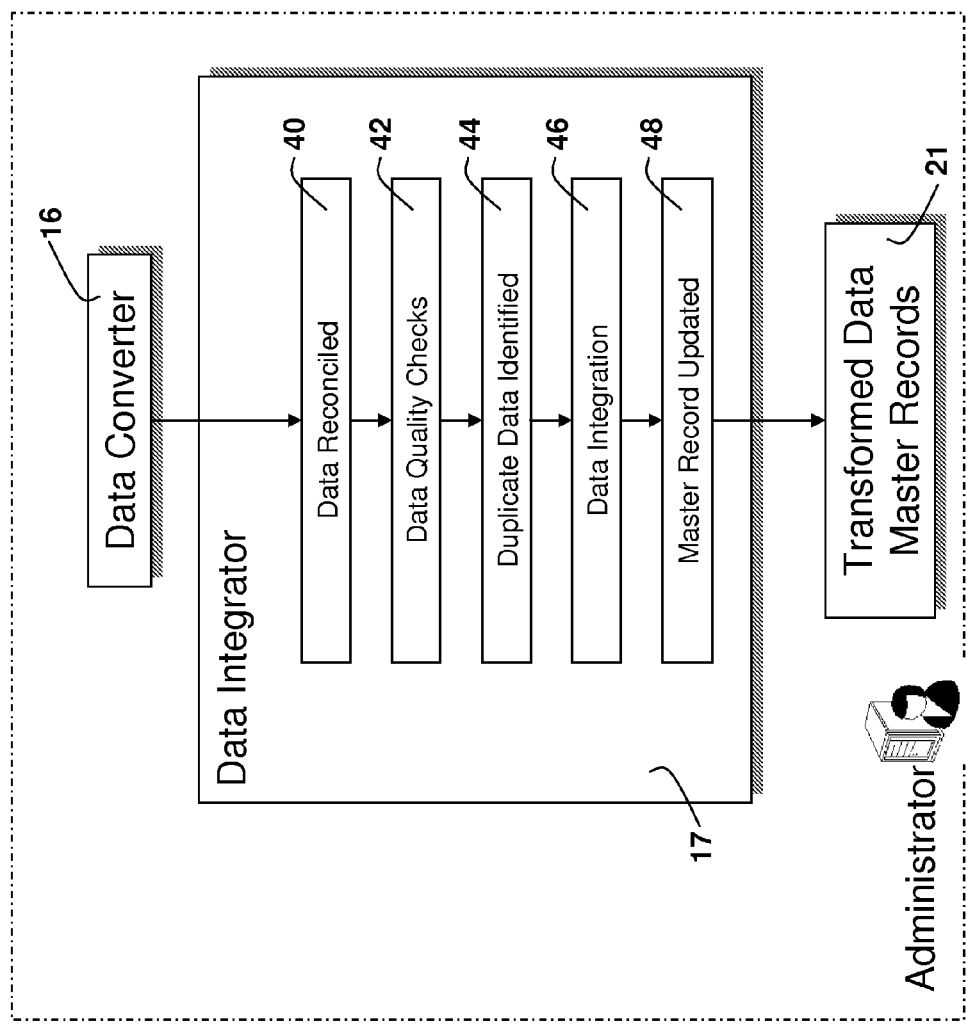
FIG. 3 shows steps in a process within a Data Integrator (DI) within the RIS of FIG. 1.

The DI 17, as shown in FIG. 3, reconciles the converted data 40 between heterogeneous (disparate) information sources by performing cross-checks between duplicate entries using tools such as pattern checks. Data quality checks 42 are incorporated and performed to verify that any updates to the data will reflect appropriate data types. Fields are checked against pre-defined criteria to determine if the contents match the expected data type. For example, date fields are checked to verify that the contents are a recognizable date. Dates of regulatory submissions, for example, are checked against the approval dates to verify that the approval came after the submit date. When discrepancies are noted, the DI 17 can either correct the format, or send an error messages to alert an attendant or the administrator, who then intervenes to examine and resolve the discrepancy appropriately.

Historical information will preferably be kept, even though an information source may remove its "old" data, perhaps through a data attrition process. For instance, when an information type is updated, that information type may be completely reloaded (e.g.; replacing all of the previous data), or only new/changed information may be added. Duplicate information is identified and, as appropriate, eliminated 44. The remaining data is integrated 46 into an indexed record 46. This record is used to update or replace 48 the records contained in the Transformed Data Master Record (TDMR) 21.

The MP 18 includes the TDMR 21, the QE 20, the UAM 26, and the DA 19. Within the TDMR 21 each information type 28 is segregated into data containers comprised of consolidated records. This segregation enables the user to make more focused queries within only those data containers that are relevant to the subject of the query.

Figure 5:
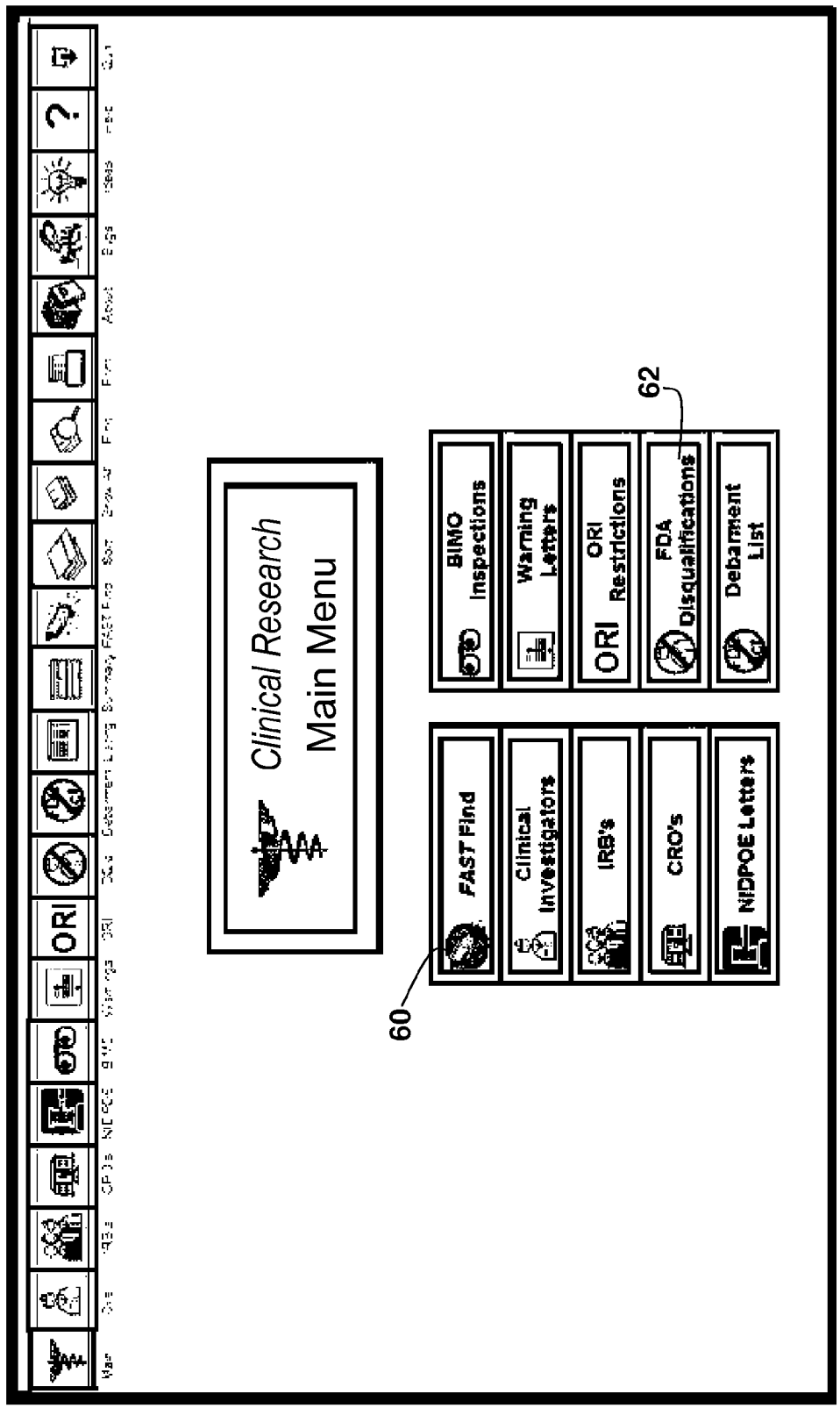
FIG. 5 shows an example of a query menu for regulatory information relating to clinical research.

A user interface (UI), such as is seen in FIG. 5, allows the user to select a subject for the user's query 23. The subject of the user's query 23 can be a person, a company, a product, and/or a regulatory performance measure. The user can allow the QE 20 to search all information types, by selection of a "Fast Find" function 60, or only those believed relevant to the subject. A global query can be made to all information types or it can be narrowed to specific categories of information, such as clinical research, pharmaceuticals or medical devices.

FIG. 5 shows an example of a screen for submitting a query in the area of clinical research. The user can elect to search all relevant information types with a single query ("FAST Find" 60). For example, if the query subject of the user's query 23 is a person involved with clinical research, relevant information may only be contained in information types 28 (e.g.; limited to only Info Types 2, 3, 4, 6, and 12 seen in FIG. 4). The Query Engine (QE) 20 will execute a search through the appropriate information types. In this manner, search time is minimized because the QE 20 can use one or more predetermined filters to identify those information types that may contain records relating to the query subject of the user's query 23.

Correspondingly, if the user only wishes to know whether the subject has been disqualified, using an FDA disqualification function 62, by the FDA as a clinical investigator, the query can be directed at this single information type. Each information type may be queried for more detailed queries within a selected information type. Examples of other criteria that can be included in the query include, but are not limited to: geographical location; dates; or date ranges and license numbers.

A User Query 23 performed for a person's name as the subject would return any information associated with that person. For example, FIG. 6 shows a search for several physicians within the clinical research category. Records returned may reflect participation in clinical trials 77; inspections conducted by FDA or other government oversight groups 79; regulatory warning letters issued 80; records relating to scientific misconduct in research 82; and debarment status 83.

In FIG. 6, one possible display of query results show that Nancy Jones, MD, PhD 71 has been a clinical investigator on one or more pharmaceutical clinical studies 77; has received a "Notice of Initiation of Disqualification Proceedings and Opportunity to Explain" (NIDPOE) letter 78; a regulatory warning letter 80; and has been either disqualified or restricted 81 by the FDA. An indicator ("Yes" in the example) tells the user that there is a match in an information type. A mouse click on the indicator opens a window that provides a quick review of the matching record. FIG. 7 shows two examples of a warning letter summary record 90. If the actual letter is available, a button 91 indicates it is immediately available. A mouse click will open the letter for detailed viewing.

Figure 4:
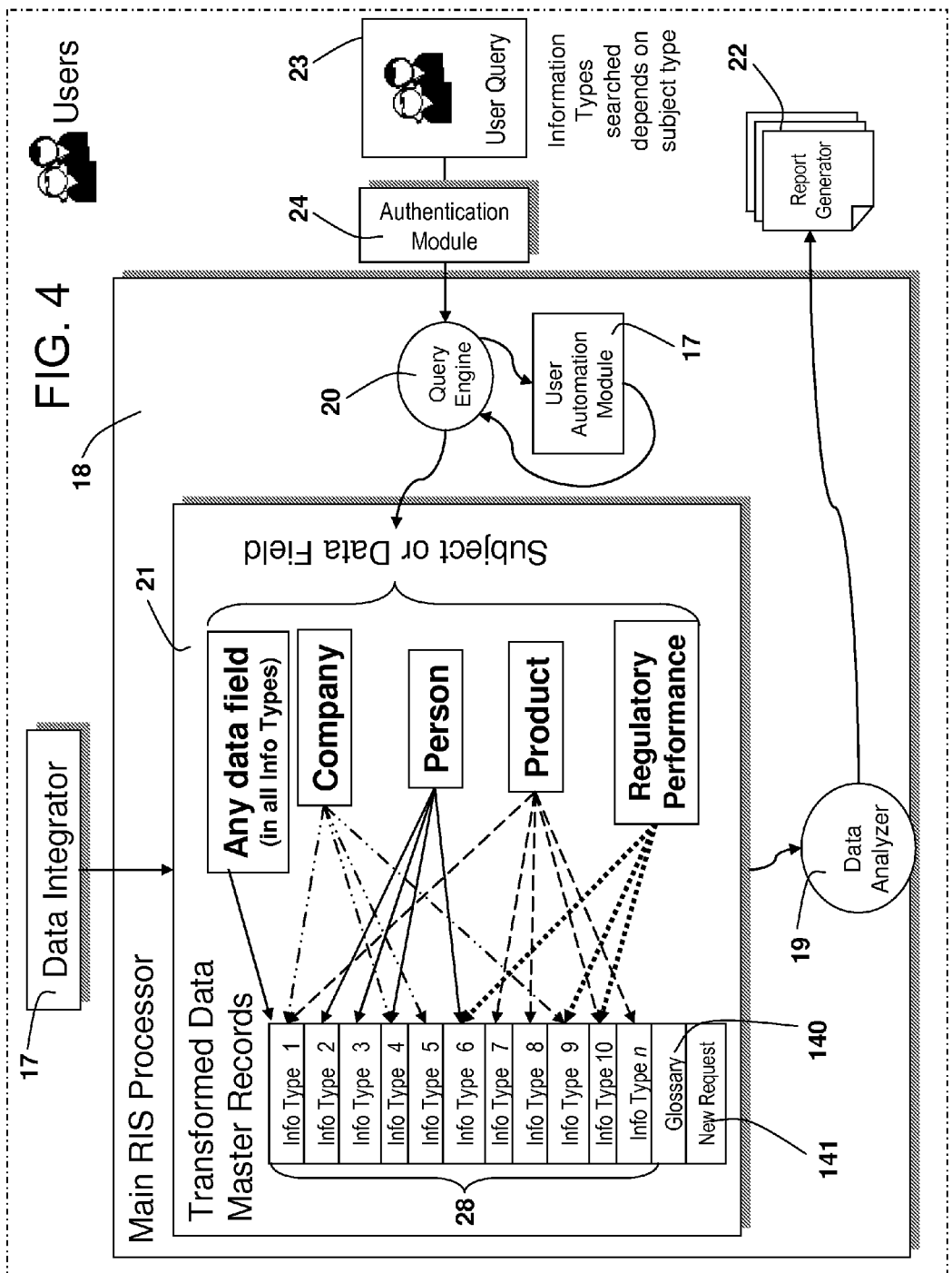
FIG. 4 shows steps for searching within a Main Processor (MP), including the Transformed Data Master Record (TDMR) within the RIS of FIG. 1.

A User Automation Module (UAM) 26 seen in FIG. 4 allows the user to repeat a specific search by saving the search criteria. During a follow-up session, the user can review previous searches and repeat them as desired. Automated repeat searches can be requested, with the resulting report provided to the user via e-mail and/or directly to a pre-defined printer in their pre-selected, preferred format. These repeat queries can be "on demand" or scheduled at specified intervals.

Data analysis 19 varies, depending upon the subject of the query. The analysis may consist of simple tabulations or more complex summaries and sub-summaries. For example, a search for a person's name may return a simple statement of the establishment registrations for which they are the designated official contact. Regulatory Performance searches may require more detailed analysis (FIG. 9). For example, to examine the number and nature of warning letters issued for GMP violations in 1999 compared to those issued in 2000, 2001, 2002, and 2003, the system will summarize the five years separately and will also report the overall totals, sorted by the subject area of the warning letter.

The Report Generator (RG) 22 can generate reports in a form that is understandable to both regulatory and non-regulatory professionals. The user can select from a list of standard report formats that reflect the information types related to the query subject. Custom reports can also be requested. The UAM 26 can "remember" the sorting order and report format selected, making it easier to obtain updates or retrieve previous reports. It can also save a copy of the criteria used in the query, the sorting order specified, and a copy of the report.

A report based on the name of a prescription drug would receive a report (FIG. 8) including information such as the sponsor company who has approval to market the drug 100; orphan drug status 101; type of review the drug underwent (e.g., expedited, routine) 102; regulatory history (product approvals 103); the Summary of Safety and Effectiveness documents for the drug 104; label changes made for safety reasons 105; product recalls 106; and regulatory warning letters issued 107 about the drug.

The User Query 23 subject may also be Regulatory Performance (FIG. 9) in specified areas. The review history of a specific type of product provides insight into the number of submissions approved for a particular device 110; how long the product was under regulatory review by a particular reviewing group 111. It may be beneficial to the user to retrieve the number and nature of recalls 112 or regulatory warning letters 113 issued on a particular topic as these provide insight into enforcement patterns and trends within a particular regulatory agency.

The RG 22 can report all information or only new information since the previous report was generated. For example, a report of all premarket notifications submitted by a particular company can be scheduled for the 10$^{th}$ day of each month. After the first report generated, subsequent queries can return only new submissions that have been cleared since the last report. An e-mail notification function in the UAM 26 either alerts the user to retrieve the report or e-mails an electronic version to the user.

Figure 10:
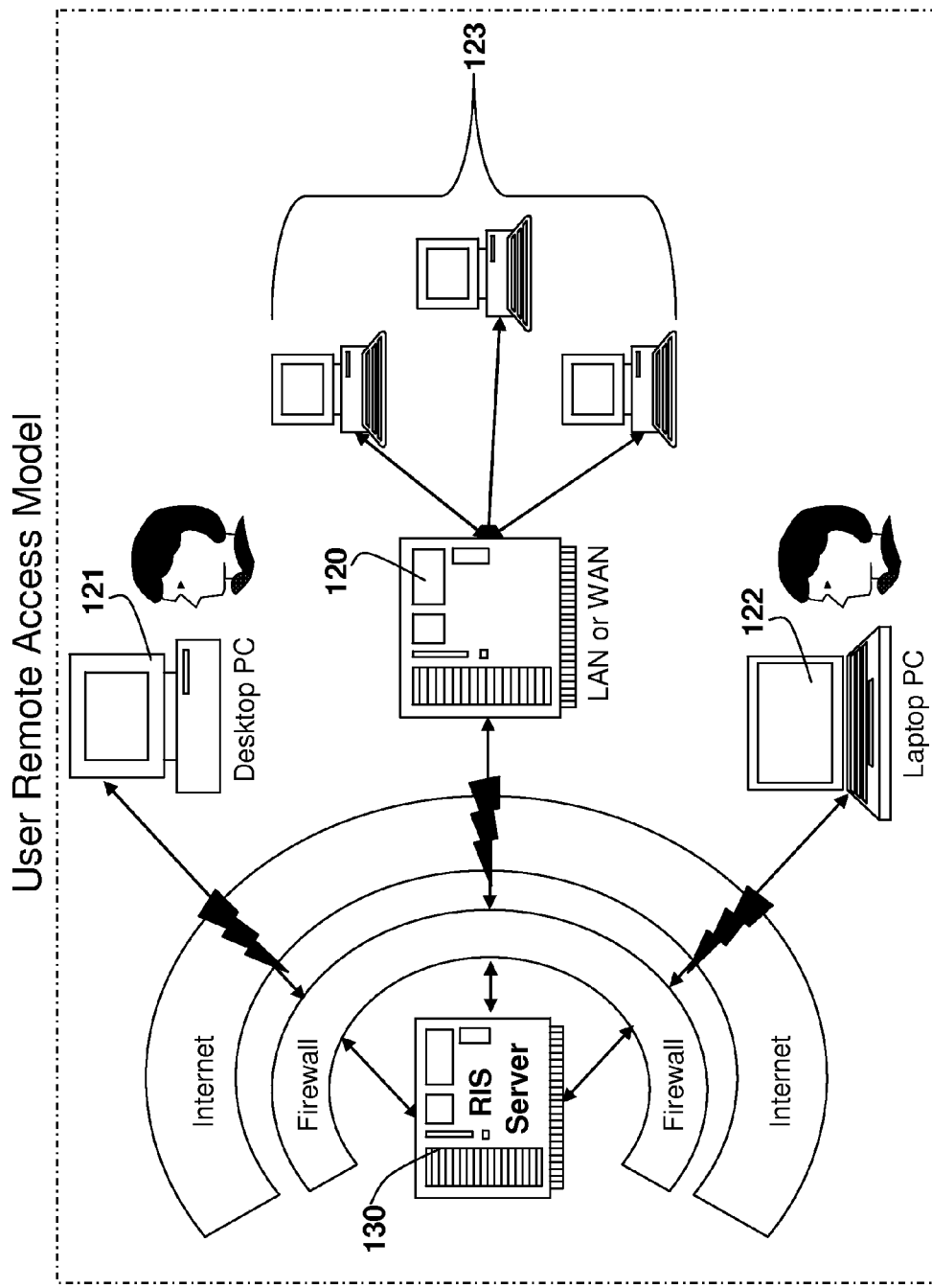
FIG. 10 depicts examples of a Remote Access Model for the RIS of FIG. 1.

Access to the RIS 10 is provided through a variety of hardware configurations. Examples given here are some of the possible configurations and are not meant to show all possible solutions. As shown in FIG. 10, the RIS 10 resides on a central server or mainframe 120, 130. The MP 18 controls user access 24 and queries (20, 23) to the TDMR 21 as well as the data analysis 19 and report generation 22. Access to the MP 18 can either be through a Remote Access Model (FIG. 10) or a Resident Access Model (FIG. 11).

The Remote Access Model shown in FIG. 10 allows users direct access to the MP 18 via an internet or other suitable connection. Queries are sent from the remote location to the MP 18 where they are processed and a selected report is returned to the user. This remote access can be through an individual desktop 121 or laptop computer 122, or through a network 123.

Figure 11:
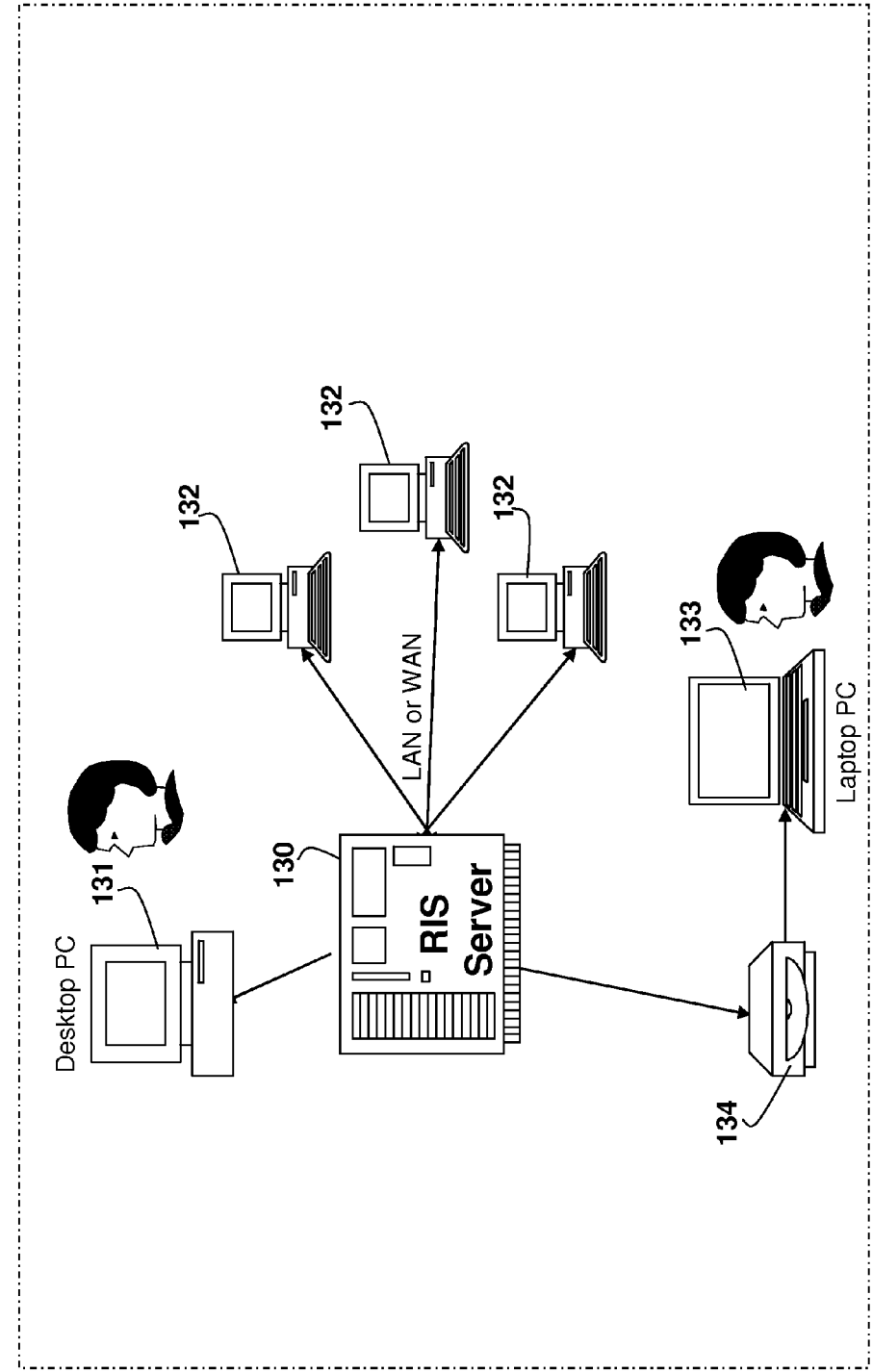
FIG. 11 depicts examples of a Resident Access Model for the RIS of FIG. 1.

The Resident Access Model shown in FIG. 11 uses a local mainframe or server 130, desktop PC 131 or laptop 133 as the MP 18. The MP 18 components, including the QE 20, the TDMR 21, and the RG 22, are physically transferred via download or other media 134 (e.g., CD-ROM, or DVD) to storage (e.g.; a hard disk) that is resident with the user. The TDMR 21 is then updated with scheduled downloads from the RIS 10.

One type of regulatory information that can be retrieved and reported by use of User Query 23 is regulatory performance measurement data. A user can define the regulatory performance measurement data that is to be calculated and displayed. A user can also employ the User Query 23 to define the specific subject or subject type that is to be analyzed by RIS 10. Queries submitted via the User Query 23 are authenticated against defined criteria to allow access to specific data types and sources within RIS 10. As such, the User Query 23 allows a user to submit a query and retrieve the results of a search within a specified subject type or category. Multiple criteria searches within a plurality of disparate data records can be performed according to user specifications with the User Query 23. Searches can be performed within a user specified subset of the disparate data sources. The searches can be limited by RIS 10 to a specified subset of disparate data records to which the user has access. In one such search specified by a user, the search criteria can be retrieved from a plurality of data tables, where data is retrieved based upon a received search criteria. When data is retrieved that matches the received search criteria, that data is consolidated for reporting the results of the user's query. The reporting can include displaying the consolidated data in a default format or in a format specified by the user.

The search request using RIS 10 can be presented to the user in multiple access venues. These venues include venues in which the user initiates a search request via a web-based interface, or via local access through a LAN or WAN. The user initiated search requests can be displayed via a web-based interface or via local access through a LAN or WAN.

Data retrieved by RIS 10 can be aggregated and organized for incorporating into one or more types of reports. The data that is retrieved and displayed, when so specified by a user, can be specific to the subject type and nature of the user's query. For instance, the user can specify that regulatory performance reports are to be generated within a user specified subject type.

Searches can be authenticated based on user and subject type, where the authentication function specifies the level of a user's access to both subject type and data. Moreover, the authentication function can specify the data sources that are accessible to the user (e.g.; the search requests can be authenticated based only on the user and the subject type). A report that displays request submitted by a user via user query 23 can be authenticated based on the user and the subject type. The type of report can be tables, charts and/or graphs, each of which can be created from the data that was retrieved and summarized by RIS 10.

The user query 23 allows a user to specify a report that is generated upon user selected time intervals or upon the occurrence of user selected specific events. Also, RIS 10 allows the user to specify the generation of reports based on searches conducted upon request by the user, or to specify criteria for searches to be conducted upon the availability of updated information in one or more of the disparate data sources, or to specify the generation of reports based on searches conducted upon the availability of updated information in one or more of disparate data sources.

Pre-defined searches can be retained by RIS 10 for execution according to user-specified terms. The pre-defined searches can be used to generate reports that are also retained by RIS 10 for display according to the user specified terms.

RIS 10 can generate notifications of the availability of new information from one or more different data sources. As such, a UI for RIS 10 allows the user to define the types of notifications that the user requires based on the different data sources. The user, for instance, can define the types of notifications that the user requires based on a specified subject, or the time interval of the notifications that the user requires, or which specific events for which notifications are required by the user. The user can also define the nature of the delivery of the notification.

CONCLUSION

The disclosed system and method, in their various embodiments and alternatives discussed above, solves resource use and financial problems inherent in integrating diverse regulatory information sources, and produces a consolidated and reconciled collection of data within a single topic record in which duplication, redundancy, and data format inconsistencies are reduced. The single topic record can be advantageously used to produce reports in a form that is understandable to both regulatory and non-regulatory professionals.

While preferred embodiments of this invention have been shown and described, modifications thereof can be made by one skilled in the art without departing from the spirit or teaching of this invention. The embodiments described herein are exemplary only and are not limiting. Many variations and modifications of the method and any apparatus are possible and are within the scope of the invention. One of ordinary skill in the art will recognize that the process just described may easily have steps added, taken away, or modified without departing from the principles of the present invention. Accordingly, the scope of protection is not limited to the embodiments described herein, but is only limited by the claims that follow, the scope of which shall include all equivalents of the subject matter of the claims.

What is claimed is:

1. A reporting system for regulatory intelligence information from a plurality of heterogeneous regulatory information sources implemented on a computer system, the reporting system comprising:
   a processor; an information retrieval system that collects information from the plurality of heterogeneous regulatory information sources, wherein the information retrieval system collects information from multiple sources including local and web-based data sources, commercial databases, and hard copy documents, wherein the information retrieval system is configured to perform authorization to access and retrieve data from the database of consolidated heterogeneous regulatory information sources;
   a data integrator that reconciles the collected information and integrates it into a common form, wherein the data integrator converts the collected information into one or more appropriate data table while maintaining links to related data, wherein the data integrator checks the collected information for errors by utilizing a predetermined standard defined by an Administrator, wherein the data errors are corrected according to standard, established criteria established by the Administrator;
   a database of consolidated heterogeneous regulatory information sources in which the collected and integrated information is stored;
   a query engine receiving a specification of a search of the information from the database of consolidated heterogeneous regulatory information sources; and
   a report generator that outputs the results of a query by the query engine of the database of consolidated heterogeneous regulatory information sources as processed by the data integrator and data analyzer, wherein the data integrator forms the database of consolidated heterogeneous regulatory information sources from the collected information, the database comprises relational tables that associate the plurality of heterogeneous information sources and data fields with one another, wherein the data integrator converts the collected information into a plurality of predetermined electronic forms for output according to a plurality of predetermined analysis and output formats.

2. The reporting system as defined in claim 1, wherein the information collected by the information retrieval system is retrieved and transferred for further processing and analysis.

3. The reporting system as defined in claim 1, wherein the data integrator converts the collected information into a predetermined electronic form.

4. The reporting system as defined in claim 1, wherein the data integrator integrates the collected information to link to one or more of a subject, a category, and a data field.

5. The reporting system as defined in claim 1, wherein the data integrator further comprises a data analyzer that:
   analyzes and summarizes the collected information; and
   locate duplicate data and eliminate redundancies.

6. The reporting system as defined in claim 1, wherein the data integrator is configured to consolidate data retrieved from the plurality of data sources into one or more common records.

7. The reporting system as defined in claim 1, wherein the report generator outputs a display of the collected information that is associated with a single subject.

8. The reporting system as defined in claim 1, wherein the report generator outputs the collected information via a display selected from the group consisting of a web-based interface, a locally accessed server, a desktop interface, and a telecommunications access.

9. A method comprising accessing, querying, identifying, and retrieving data from a consolidation of information collected from a plurality of heterogeneous regulatory information data sources, wherein:
   receiving, from a user interface, a query specification and a reporting specification;
   accessing data from a regulatory information data source selected from the group consisting of regulatory performance data, regulatory compliance data, regulatory requirements data, and the combination thereof;
   querying the accessed data according to the query specification, wherein identifying the queried data;
      retrieving the identified data, wherein each data source within the consolidated has; a predetermined digital content and format;
      predetermined schema for inclusion in the consolidation; and
      predetermined indexing for user searches;
   the method further comprising:
   converting the retrieved data into the predetermined digital format, wherein the data, prior to the converting the received data into the predetermined digital format, is in a published on a web page, the method further comprises:
   converting the data in the predetermined data field into a spreadsheet application; and
   converting the data in the table into predetermined data fields within the consolidated regulatory information database;
   importing the data in the predetermined digital format into an electronic database; and
   querying and reporting on the regulatory, data in the consolidated database, wherein the reporting on the data in the consolidated regulatory information database is according to a predetermined or customized user report specification, wherein, prior to the reporting, the further comprises removing duplicate data from the electronic database; and
   performing authorization to access and retrieve data from the database of consolidated heterogeneous regulatory information sources including local and web-based data sources, commercial databases, and hard copy documents.

10. The method as defined in claim 9, wherein the data, prior to the converting of the received data into the predetermined digital format, is in a format selected from the group consisting of:
    a portable data format (PDF),
    a markup language formation; selected from the group consisting of XML, HTML, and combinations thereof;
    a word processing format;
    a spreadsheet format;
    a graphic format;
    a delimited text format; and
    a table published on a web page.

11. The method as defined in claim 9, wherein the predetermined user specification is an indexed query topic selected from the group consisting of a person, a company, a product, a regulatory specialty and any combination thereof.

12. The method as defined in claim 9, wherein the predetermined user specification is a persons name, and the data collected corresponds to the person and is selected from the group consisting of participation in a regulated activity, inspections conducted, regulatory documentation, regulatory orders, regulatory communications issued, scientific misconduct, debarment status, exclusion status, regulatory prosecutions, and combinations thereof.

13. The method as defined in claim 9, wherein the predetermined user specification is an indexed query topic selected from the group consisting of a good, a service, a regulatory performance measure, and combinations thereof.

14. The method as defined in claim 9, wherein the predetermined user specification is an indexed query topic selected from the group consisting of a regulated article, agency and combinations thereof.

15. The method as defined in claim 9, wherein the predetermined user specification includes a limitation selected from the group consisting of: regulatory districts; regulatory jurisdictions, dates, and regulatory agency actions.

* * * * *